US008256280B2

(12) United States Patent
Aoki et al.

(10) Patent No.: US 8,256,280 B2
(45) Date of Patent: Sep. 4, 2012

(54) ARRANGEMENT STRUCTURE FOR SENSOR TO BE MOUNTED TO ENGINE OF VEHICLE

(75) Inventors: Akinobu Aoki, Kure (JP); Masaaki Sato, Higashihiroshima (JP); Nobuhiro Fujii, Hiroshima (JP); Kenji Kashiyama, Hiroshima (JP); Noriyoshi Okii, Hiroshima (JP); Tomohiro Koguchi, Hiroshima (JP); Fumie Kitakaze, Hiroshima (JP); Atsushi Hisano, Akashi (JP)

(73) Assignee: Mazda Motor Corporation (JP)

( * ) Notice: Subject to any disclaimer, the term of this patent is extended or adjusted under 35 U.S.C. 154(b) by 452 days.

(21) Appl. No.: 12/555,391

(22) Filed: Sep. 8, 2009

(65) Prior Publication Data

US 2010/0064787 A1 Mar. 18, 2010

(30) Foreign Application Priority Data

Sep. 17, 2008 (JP) ................................ 2008-238134

(51) Int. Cl.
*G01M 15/06* (2006.01)

(52) U.S. Cl. .................................................... 73/114.26

(58) Field of Classification Search .. 73/114.24–114.26, 73/866.5
See application file for complete search history.

(56) References Cited

U.S. PATENT DOCUMENTS 4,413,701 A 11/1983 Kumagai
4,796,722 A 1/1989 Kumagai
5,066,266 A * 11/1991 Kobayashi ...................... 475/59
5,083,478 A * 1/1992 Hiraiwa ........................ 180/247
5,257,674 A * 11/1993 Okui et al. .................... 180/297
5,704,443 A * 1/1998 Janiszewski .................. 180/247
(Continued)

FOREIGN PATENT DOCUMENTS

EP 1 482 149 A1 12/2004
(Continued)

OTHER PUBLICATIONS

Extended European Search Report dated Jan. 26, 2010; Application No. 09168592.5-2311.

(Continued)

*Primary Examiner* — Freddie Kirkland, III
(74) *Attorney, Agent, or Firm* — Studebaker & Brackett PC; Donald R. Studebaker

(57) ABSTRACT

Disclosed is an arrangement structure for a sensor to be mounted to an engine of a vehicle, wherein the engine is arranged in an engine compartment 2 of the vehicle in a posture allowing a crankshaft 8 of the engine to be oriented in a widthwise direction of the vehicle. The arrangement structure comprises a driveshaft 50 arranged along a vehicle-rearward lateral surface of the engine 1 facing in a rearward direction of the vehicle, to rotatably drive a front wheel, and a flange section 28*a* provided as a joining section between two members (12, 15) constituting the engine 1, to protrude in the rearward direction of the vehicle and at a height position below that of the driveshaft 50, wherein the sensor 42 is mounted to the vehicle-rearward lateral surface of the engine 1 at a height position located above the flange section 28*a* and in overlapping relation with the driveshaft 50 when viewed from a rear side of the vehicle. The arrangement structure of the present invention is capable of more reliably protecting the sensor mounted to the engine against foreign objects, such as water and a pebble, to adequately maintain performance of the sensor on a long-term basis.

11 Claims, 6 Drawing Sheets

U.S. PATENT DOCUMENTS

| | | | | | |
|---|---|---|---|---|---|
| 5,813,381 | A * | 9/1998 | Kakimoto et al. | 123/195 A |
| 6,490,914 | B1 * | 12/2002 | Brandenburg et al. | 73/114.26 |
| 6,976,790 | B2 * | 12/2005 | Min | 384/488 |

FOREIGN PATENT DOCUMENTS

| | | | |
|---|---|---|---|
| JP | 57-107626 | U | 7/1982 |
| JP | 62-135639 | U | 8/1987 |
| JP | 2001 055944 | A | 2/2001 |
| JP | 2005 030311 | A | 2/2005 |
| JP | 2005-030311 | A | 2/2005 |
| JP | 2008-169730 | A | 7/2008 |

OTHER PUBLICATIONS

Japanese Office Action "Notice of Reasons for Rejection" dated Sep. 7, 2010; Japanese Patent Application No. 2008-238134 with English Translation.

* cited by examiner

ARRANGEMENT STRUCTURE FOR SENSOR TO BE MOUNTED TO ENGINE OF VEHICLE

BACKGROUND OF THE INVENTION

1. Field of the Invention

The present invention relates to an arrangement structure for a sensor to be mounted to an engine of a vehicle, wherein the engine is arranged in an engine compartment of the vehicle in a posture allowing a crankshaft of the engine to be oriented in a widthwise direction of the vehicle, and the sensor is mounted to a lateral surface of the engine.

2. Description of the Background Art

Heretofore, there has been known an internal combustion engine for a vehicle, which comprises a crankshaft rotatably supported by an engine bock, a compressor mounted to the engine block through a bracket, and a crank angle sensor mounted to a vehicle-frontward wall surface of the engine block facing in a frontward direction of the vehicle, while being exposed outside the engine block, wherein the bracket is provided between the engine block and the compressor, and the crank angle sensor is disposed at a given position of the vehicle-frontward wall surface of the engine block covered by the bracket, as disclosed, for example, in JP 2005-30311A.

In the structure disclosed in the above Patent Document, the crank angle sensor mounted to the vehicle-frontward wall surface of the engine block is covered by the compressor-mounting bracket. This provides an advantage of being able to protect the crank angle sensor against a pebble and water coming in from a front end of the vehicle during traveling of the vehicle.

However, in case where a crank angle sensor is mounted to a vehicle-frontward wall surface of an engine facing in a frontward direction of a vehicle as in the structure disclosed in the above Parent Document, for example, in the event that a relatively large amount of water comes in from the front end of the vehicle, the incoming water is likely to reach the sensor through a small gap or the like and wet the sensor, even if the sensor is shielded by a member, such as a bracket, which is liable to cause adverse effects on performance of the sensor.

Therefore, in view of more reliably prevent the sensor from being wetted by water coming in from the front end of the vehicle, it can be said that it is desirable to mount the sensor to a vehicle-rearward wall surface of the engine facing in a rearward direction of the vehicle, instead of the vehicle-frontward wall surface of the engine. However, even if a mounting position of the sensor is simply changed to the vehicle-rearward wall surface of the engine, it is unable to eliminate a possibility that a foreign object, such as a pebble kicked up by a front wheel, hits the sensor, and there remains a risk of being unable to maintain performance of the sensor on a long-term basis.

SUMMARY OF THE INVENTION

In view of the above circumstances, it is an object of the present invention to provide an arrangement structure for a sensor to be mounted to an engine of a vehicle, which is capable of more reliably protecting the sensor mounted to the engine against foreign objects, such as water and a pebble, to adequately maintain performance of the sensor on a long-term basis.

In order to achieve the above object, the present invention provides an arrangement structure for a sensor to be mounted to an engine of a vehicle, wherein the engine is arranged in an engine compartment of the vehicle in a posture allowing a crankshaft of the engine to be oriented in a widthwise direction of the vehicle, and the sensor is mounted to a lateral surface of the engine. The arrangement structure comprises a driveshaft arranged along a vehicle-rearward lateral surface of the engine facing in a rearward direction of the vehicle, to rotatably drive a front wheel, and a flange section provided as a joining section between two members constituting the engine, to protrude in the rearward direction of the vehicle and at a height position below that of the driveshaft, wherein the sensor is mounted to the vehicle-rearward lateral surface of the engine at a height position located above the flange section and in overlapping relation with the driveshaft when viewed from a rear side of the vehicle.

DESCRIPTION OF THE PREFERRED EMBODIMENTS

Figure 1:
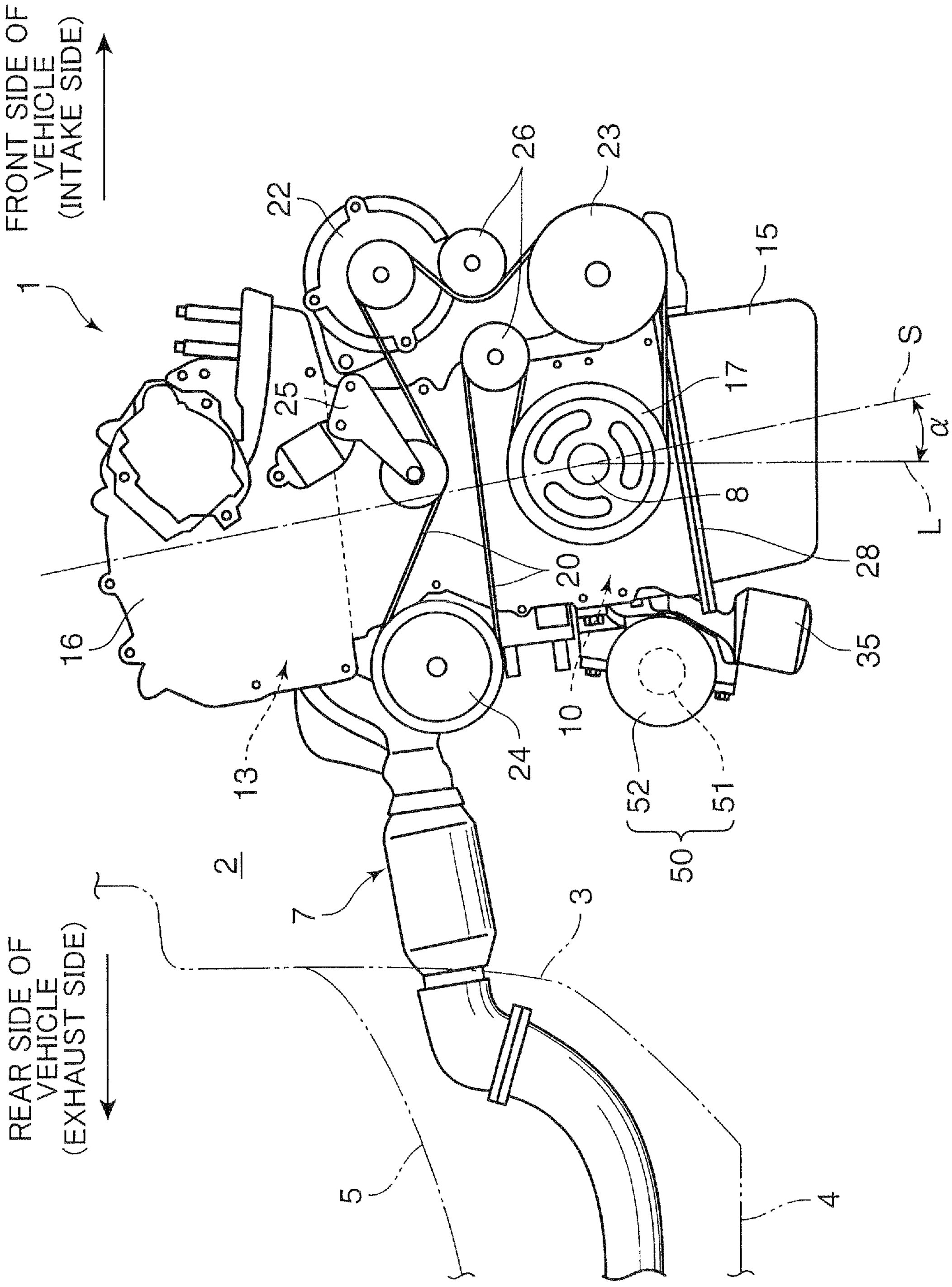
FIG. 1 is a front view showing an overall structure of an engine employing an arrangement structure for a sensor to be mounted to an engine of a vehicle, according to one embodiment of the present invention.

FIG. 1 is a front view showing an overall structure of an engine employing an arrangement structure for a sensor to be mounted to an engine of a vehicle, according to one embodiment of the present invention. The engine 1 illustrated in FIG. 1 is an inline four-cylinder engine having four cylinders (not shown) arranged in line and each provided with a piston slidably fitted thereinto. The engine 1 is arranged in an engine compartment 2 of a vehicle defined in front of a dash panel 3 forming a front wall of a passenger compartment of the vehicle, in a posture allowing a crankshaft 8 of the engine 1 to be oriented in a widthwise direction of the vehicle (a direction perpendicular to the drawing sheet in FIG. 1), i.e., in a so-called "transverse or transversely mounted" posture. A line S in FIG. 1 indicates an axis of each of the cylinders. In the illustrated embodiment, the engine 1 is arranged in a posture where the axis S of the cylinder is inclined in a rearward direction of the vehicle by a given angle $\alpha$ with respect to a vertical line L.

Figure 2:
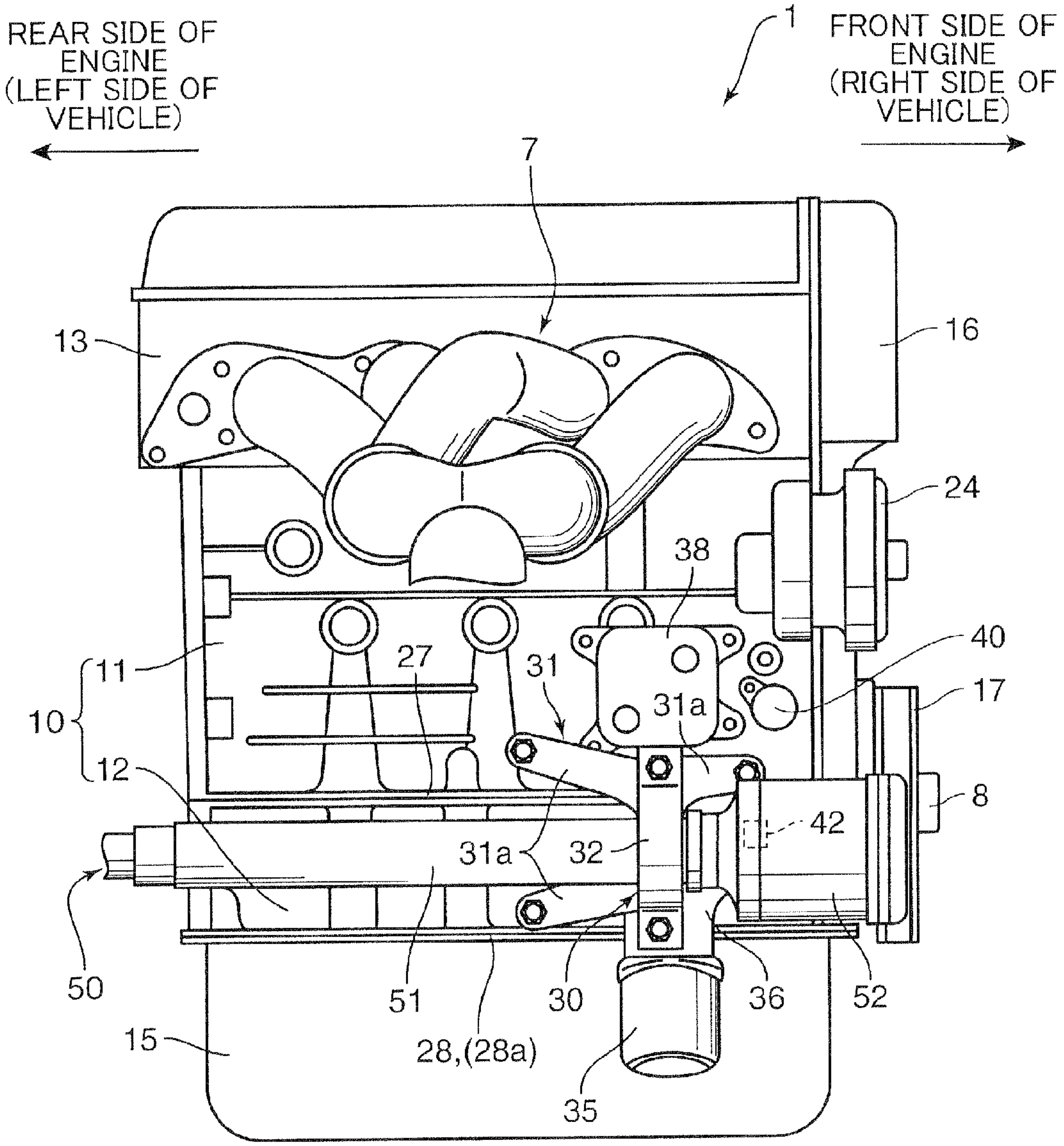
FIG. 2 is a side view showing the engine, when viewed from a rear side of the vehicle.

FIG. 2 is a side view showing the engine 1, when viewed from a rear side of the vehicle. As shown in FIGS. 1 and 2, the engine 1 comprises a cylinder block 10 having with the four cylinders formed therein, a cylinder head 13 attached onto an upper surface of the cylinder block 10 to cover the four cylinders from above, and an oil pan 15 attached to a lower surface of the cylinder block 10. An exhaust passage 7 serving as a pathway of exhaust gas formed by combustion is connected to a vehicle-rearward lateral surface of the cylinder head 13 facing in the rearward direction of the vehicle, and an intake passage (not shown) serving as a pathway of intake air is connected to a vehicle-frontward lateral surface of the cylinder head 13 facing in a frontward direction of the vehicle. In other words, the engine 1 in the illustrated embodiment is arranged in the engine compartment 2 in a posture allowing an exhaust-side lateral surface and an intake-side lateral surface to face in the rearward direction of the vehicle and in the frontward direction of the vehicle, respectively.

The exhaust passage 7 is arranged to extend from the cylinder head 13 downwardly and in the rearward direction of the vehicle, and led into a cross-sectionally inverted U-shaped floor tunnel 5 extending in a frontward-rearward (i.e., longitudinal) direction of the vehicle along a vehicle floor 4, as shown in FIG. 1. Then, the exhaust passage 7 is arranged to extend in the rearward direction of the vehicle through an inner space of the floor tunnel 5 and others, so that exhaust gas is released from an outlet provided at a rear end of the exhaust passage 7 to the outside.

Although a detailed illustration will be omitted, a transaxle (not shown) having an integrated combination of a transmission and a differential gear mechanism is attached to a wall surface of the engine 1 facing on a left side of the vehicle (on the side of a back surface of the drawing sheet of FIG. 1; on a left side of FIG. 2), and one end of the crankshaft 8 is interlockingly coupled to an input shaft of the transaxle. The following description will be made on an assumption that one end of the engine 1 on the side of the transaxle (on the side of the back surface of the drawing sheet of FIG. 1; on the left side of FIG. 2) is defined as "rear end" of the engine 1, and the other end of the engine 1 on an opposite side of the transaxle (on the side of a front surface of the drawing sheet of FIG. 1; on a right side of FIG. 2) is defined as "front end" of the engine 1.

The crankshaft 8 is rotatably supported by a lower portion of the cylinder block 10, and a drive pulley 17 is attached to a font end of the crankshaft 8 (one end of the crankshaft 8 on the right side of the vehicle). An accessory drive belt 20 is wound around the drive pulley 17 to drive various accessories (22, 23, 24, etc., in FIG. 1) mounted to the engine 1, in such a manner that, when the drive pulley 17 is drivenly rotated integrally together with the crankshaft 8, a driving force is transmitted to each of the accessories through the accessory drive belt 20. Specifically, as shown in FIGS. 1 and 2, a power-generating alternator 22, an air-conditioning compressor 23 and a coolant-circulating water pump 24 each serving as an accessory are mounted to the front end of the engine 1 (a wall surface of the engine 1 on the right side of the vehicle), and each of the accessories 22 to 24 is adapted to be driven by the accessory drive belt 20 according to rotation of the crankshaft 8. In FIG. 1, the reference numeral 25 indicates an automatic tensioner for giving a given tension to the accessory drive belt 20, and the reference numeral 26 indicates an idler pulley.

A sprocket (not shown) adapted to be rotated integrally together with the crankshaft 8 is provided between a front wall of the cylinder block 10 and the drive pulley 17 provided at the front end of the crankshaft 8, and a timing chain (not shown) is wound around the sprocket to drive a valve operating mechanism provided inside the cylinder head 13.

More specifically, a valve operating mechanism (not shown) composed of a cam mechanism or the like is provided inside the cylinder head 13 to open and close intake and exhaust valves, and the valve operating mechanism and the sprocket of the crankshaft 8 are adapted to be interlockingly coupled together through the timing chain, so that the rotation of the crankshaft 8 is transmitted to the valve operating mechanism to drivingly open and close intake and exhaust valves. In FIGS. 1 and 2, the reference numeral 16 indicates a chain cover which is provided to cover respective front walls of the cylinder block 10 and the cylinder head 13 so as to shield the timing chain.

As shown in FIG. 2, the cylinder block 10 has a two-tiered structure consisting of an upper block 11, and a lower block 12 attached to a lower surface of the upper block 11. The upper block 11 and the lower block 12 are fastened together in an upward-downward direction by a fastening member, such as a plurality of bolts, to form the cylinder block 10. A flange section 27 is provided in a joining area between a lower end of the upper block 11 and an upper end of the lower block 12 fastened by the fastening member, to protrude outwardly.

Further, as shown in FIGS. 1 and 2, the oil pan 15 is attached to a lower surface of the lower block 12 through a flange section 28. Specifically, the flange section 28 is provided in a joining area between a lower end of the lower block 12 and an upper end of the oil pan 15, and fastened in an upward-downward direction by a fastening member, such as a plurality of bolts, so that the lower block 12 and the oil pan 15 are joined together through the flange section 28.

A driveshaft 50 is arranged in the engine compartment 2 to extend in the widthwise direction of the vehicle along a vehicle-rearward lateral surface of the engine 1 facing in the rearward direction of the vehicle. The driveshaft 50 is provided as a rotary shaft for coupling the transaxle to a front-wheel hub (not shown). The driveshaft 50 includes a driveshaft body 51 extending from the differential gear mechanism in the transaxle outwardly in the widthwise direction of the vehicle, and a universal joint unit 52 interposed between the driveshaft body and the front-wheel hub to bendably couple them together. Thus, during running of the engine 1, the rotation of the crankshaft 8 is transmitted to the driveshaft body 51 through the transaxle, and further transmitted to the front-wheel hub through the universal joint unit 52 at a distal end of the driveshaft body 51, so that a front wheel is drivenly rotated integrally together with the front-wheel hub. The driveshaft 50 provided as a driving-force transmitting member is made up of a metal solid member or a pipe member having relatively high rigidity (in FIG. 3, the driveshaft 50 is illustrated as a pipe member.)

Figure 3:
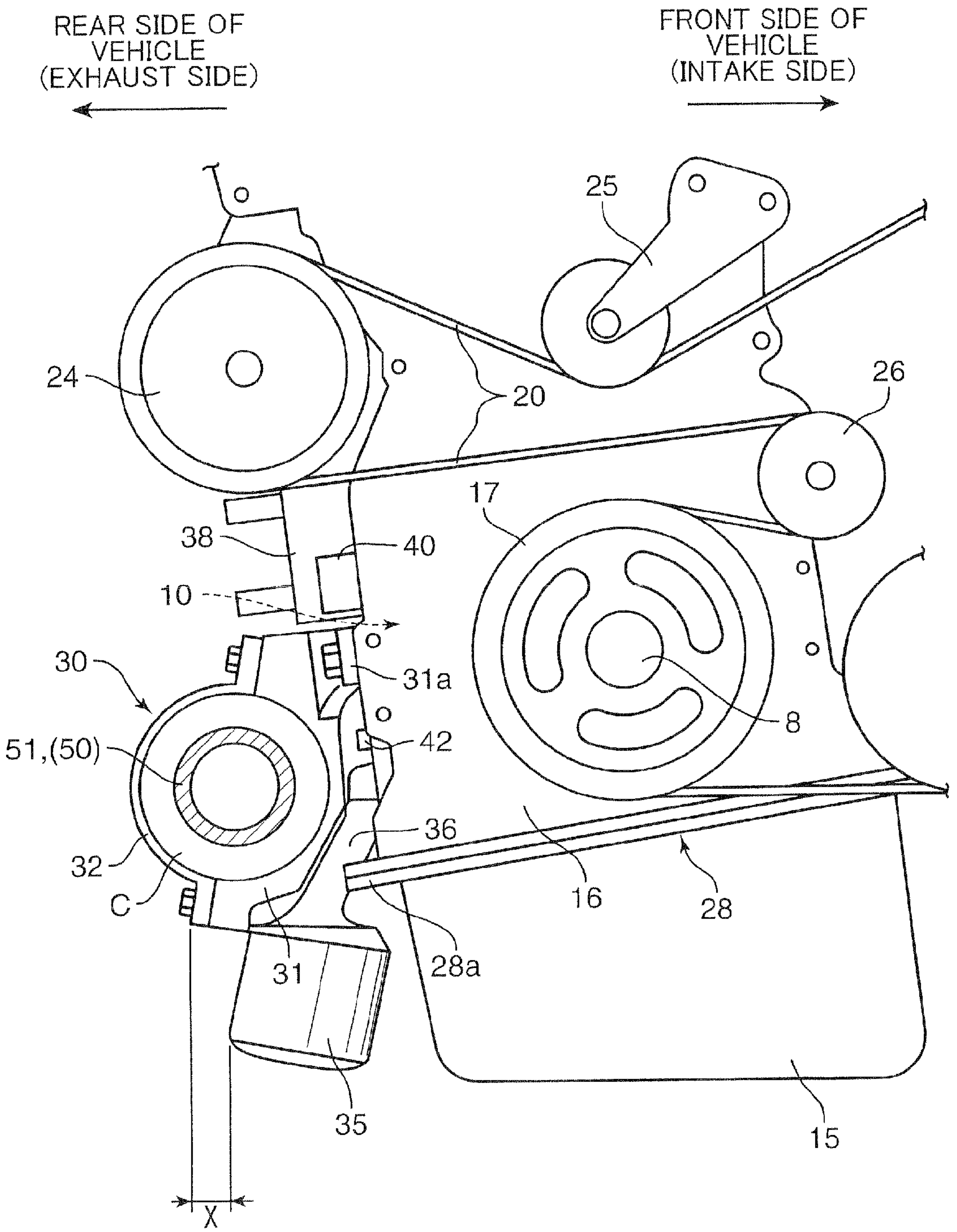
FIG. 3 is an enlarged front view showing a front end of the engine.
Figure 4:
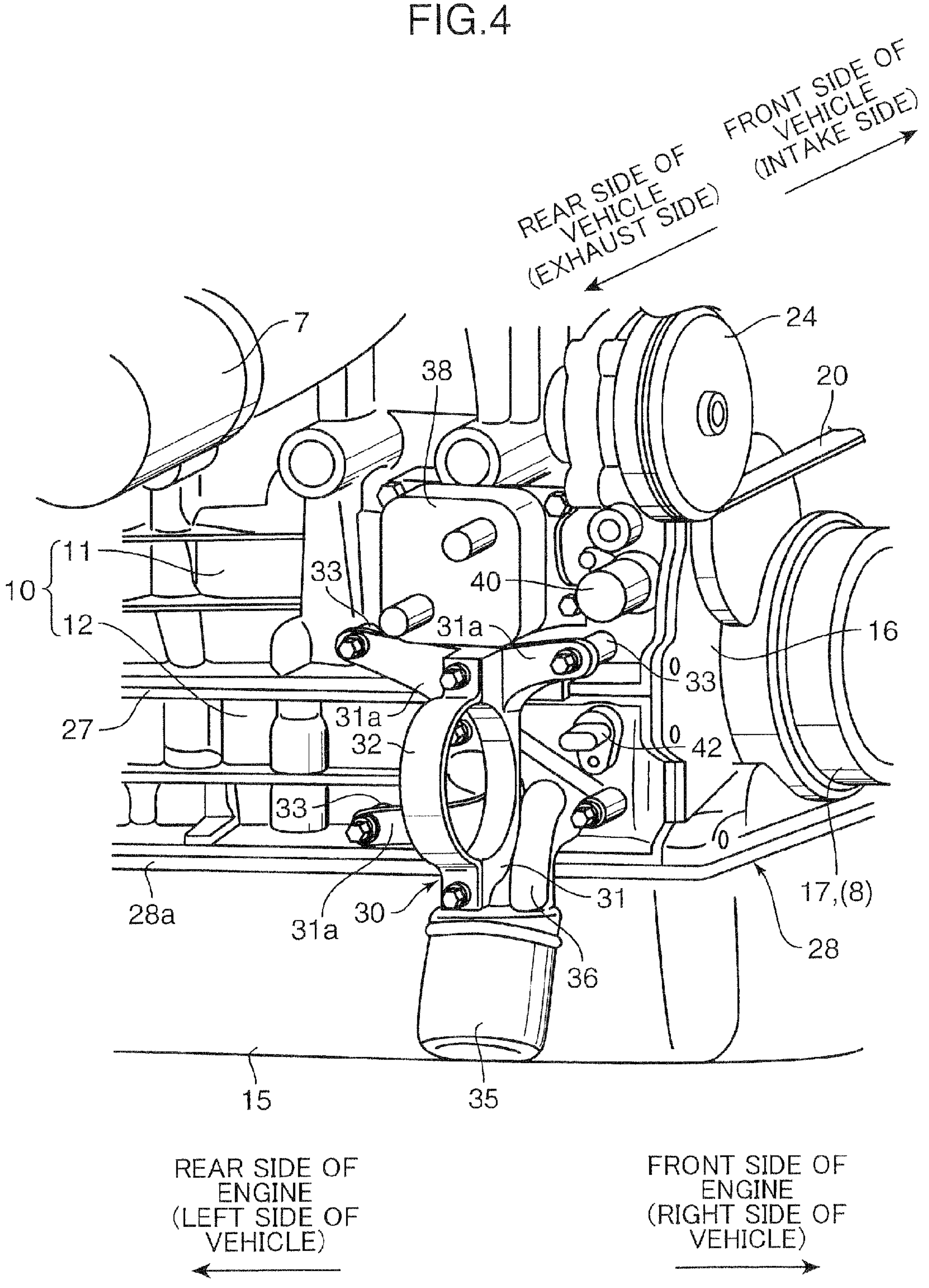
FIG. 4 is a perspective view showing a vehicle-rearward lateral surface of the engine facing in a rearward direction of the vehicle, when obliquely viewed from the rear side of the vehicle.

FIG. 3 is an enlarged front view showing the front end of the engine 1, and FIG. 4 is a perspective view showing the vehicle-rearward lateral surface of the engine 1, when obliquely viewed from the rear side of the vehicle. In FIG. 3, the driveshaft 50 is shown in a sectional view cut at an axially intermediate position thereof. Further, in FIG. 4, the driveshaft 50 is omitted. As shown in FIGS. 3 and 4 in addition to FIG. 2, a shaft joint bracket 30 is mounted to a vehicle-rearward lateral surface of the cylinder block 10 facing in the rearward direction of the vehicle to rotatably support the driveshaft 50. More specifically, the shaft joint bracket 30 is mounted to a lower region of the vehicle-rearward lateral surface of the cylinder block 10 at a position close to the front end of the engine 1, to rotatably support one end of the driveshaft body 51 on the side of the universal joint unit 52.

The shaft joint bracket 30 has a split structure consisting of a bracket body 31 fixed to the cylinder block 10, and a cap member 32 detachably fixed to the bracket body 31 through a fastening member, such as a bolt. A circular-shaped space is defined between the bracket body 31 and the cap member 32 to receive therein the driveshaft body 51, and a bearing (not shown) is attached in a gap C shown in FIG. 3 between an outer peripheral surface of the driveshaft body 51 and an inner surface of each of the bracket body 31 and the cap member 32.

The bracket body 31 has three leg portions 31*a* extending in a rightward-leftward (i.e., widthwise) direction of the vehicle. Each of the leg portions 31*a* is fastened to the vehicle-rearward lateral surface of the cylinder block 10 through a fastening member, such as a bolt, so that the shaft joint bracket 30 is detachably fixed to the engine 1.

Figure 5:
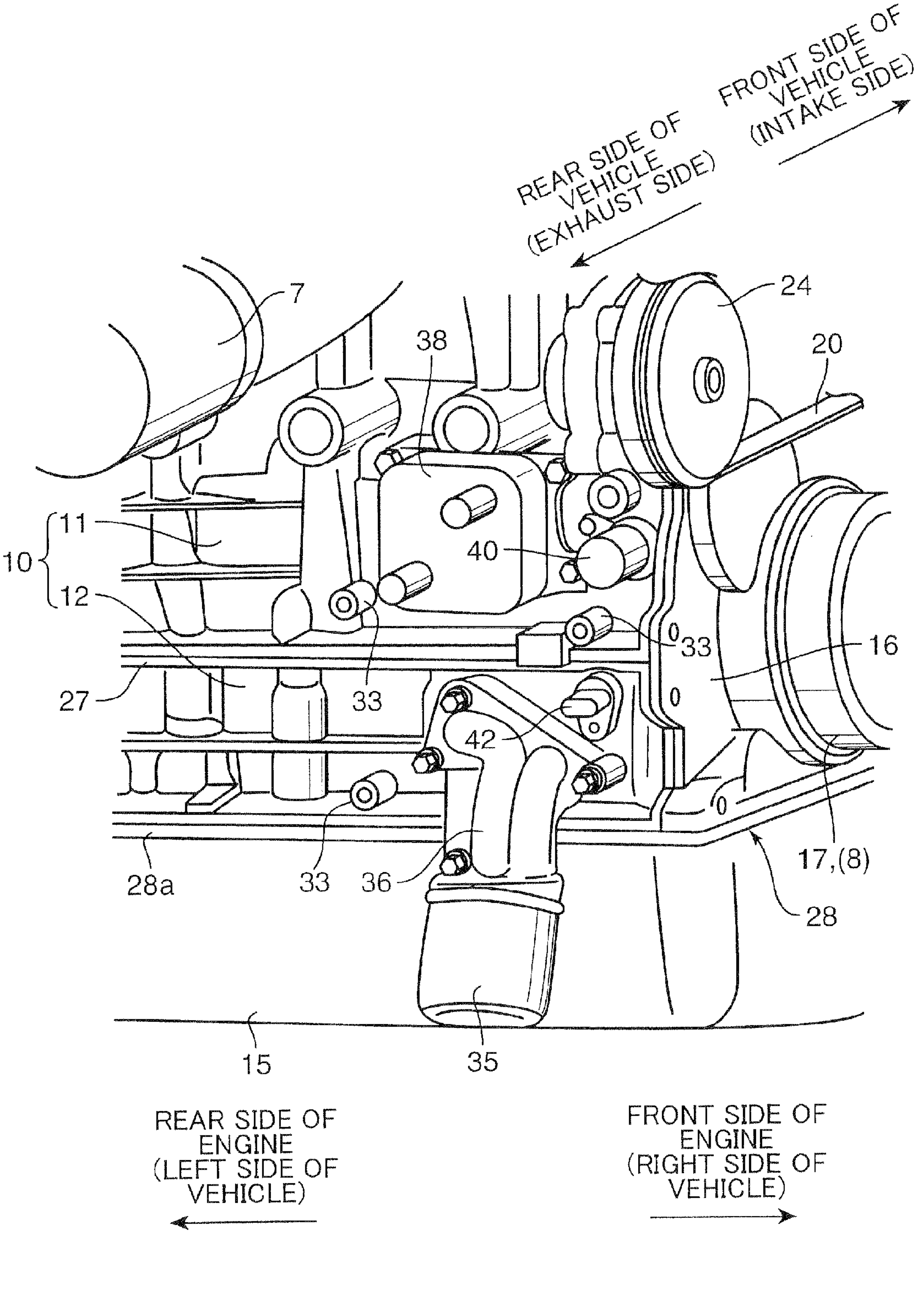
FIG. 5 is a perspective view showing the vehicle-rearward lateral surface of the engine, wherein a shaft joint bracket is detached from the engine in FIG. 4.

FIG. 5 is a perspective view showing the vehicle-rearward lateral surface of the engine 1, wherein the shaft joint bracket 30 is detached from the engine 1. As shown in FIG. 5 in addition to FIG. 4, three mounting bosses 33 are provided onto the vehicle-rearward lateral surface of the cylinder block 10 to protrude therefrom and allow respective ones of the leg portions 31*a* of the bracket body 31 to be fastened and fixed thereto. More specifically, two of the mounting bosses 33 are provided onto the upper block 11 of the cylinder block 10, and the remaining one mounting boss 33 is provided onto the lower block 12 of the cylinder block 10. A distal end of each of the leg portions 31*a* is fastened to a corresponding one of the mounting basses 33, so that the shaft joint bracket 30 is attached to extend between the upper block 11 and the lower block 12.

As shown in FIGS. 2 to 5, an oil filter 35 is mounted to a vehicle-rearward lateral surface of the lower block 12 through a filter bracket 35. The oil filter 35 is a type which houses a filter paper to filter lubricating oil (engine oil) for lubricating various internal sections of the engine 1, wherein the oil after passing through the filter paper in the oil filter 35 to remove impurities or the like therefrom is supplied to the internal sections of the engine 1 via corresponding oil passages (not shown) formed inside the engine 1.

The filter bracket 36 is made up of a metal member having rigidity greater than that of the oil filter 35, and detachably fixed to the vehicle-rearward lateral surface of the lower block 12 through a fastening member, such as a bolt. As shown in FIGS. 2 and 3, the driveshaft 50 is disposed at a height position overlapping the filter bracket 36 in an upward-downward direction, in such a manner that the filter bracket 36 is partially covered from the rear side of the vehicle by the drive shaft 50.

More specifically, the filter bracket 36 is mounted to the vehicle-rearward lateral surface of the lower block 12 at a position close to the front end of the engine 1, and partially covered from the rear side of the vehicle by the shaft joint bracket 30 which is also mounted to the vehicle-rearward lateral surface of the cylinder block 10 at the position close to the front end of the engine 1, as shown in FIGS. 2 to 4.

The filter bracket 36 is arranged to extend from the vehicle-rearward lateral surface of the lower block 12 downwardly and in the rearward direction of the vehicle, in such a manner that a lower end of the filter bracket 36 is located below the height position of the driveshaft 50 supported by the shaft joint bracket 30. The oil filter 35 is detachably fixed to the lower end of the filter bracket 36 located below the height position of the driveshaft 50, by a fastening means, such as screwing.

As shown in FIG. 3, comparing the filter bracket 36 with the shaft joint bracket 30 covering the filter bracket 36 from the rear side of the vehicle in terms of a positional relationship therebetween, the shaft joint bracket 30 is arranged to allow a rearmost edge of a lower end thereof to be located far from a rearmost edge of the oil filter 35 by a given distance X in a rearward direction of the vehicle.

As shown in FIGS. 2 to 5, a water-cooled oil cooler 38 is mounted to a region of the vehicle-rearward lateral surface of the upper block 11 located above respective mounting positions of the filter bracket 36 and the shaft joint bracket 30, to cool the lubricating oil (engine oil). More specifically, the oil cooler 38 has a flow passage for the lubricating oil and a flow passage for coolant (cooling medium) each formed therein, wherein the oil cooler 38 is adapted to reduce a temperature of the oil by means of heat exchange between the coolant and the oil.

A lubricating system of the engine 1 including the oil filter 35 and the oil cooler 38 will be briefly described below. A given amount of lubricating oil for lubricating each portion of the engine 1 is reserved in the oil pan 15, and an oil pump (not shown) composed of a trochoid pump or the like adapted to be rotated in conjunction with the crankshaft 8 is provided in a lower region inside of the engine 1 close to the front end of the engine 1, as a means to pump and pressure-feed the oil reserved in the oil pan 15. Further, the filter bracket 36 has an oil passage (not shown) formed thereinside to serve as a passage for the oil pressure-fed from the oil pump, and the oil passage formed inside the filter bracket 36 is communicated with associated oil passages formed inside the engine 1.

The oil pumped from the oil pan 15 by the oil pump is firstly introduced into the oil filter 35 via an oil passage formed inside the engine 1 to communicate between the oil pump and the filter bracket 36, and the oil passage formed inside the filter bracket 36. Subsequently, the oil filtered through the oil filter 35 and discharged from oil filter 35 is introduced into the oil cooler 38 via an oil passage formed between the filter bracket 36 and the oil cooler 38, and then fed from the oil cooler 38 to the internal sections of the engine 1, such as the crankshaft 8, a cylinder wall and the valve operating mechanism, via a plurality of oil passages each extending to a corresponding one of the internal sections of the engine 1.

A relief solenoid valve 40 is provided in a common oil passage as a part of the oil passages leading the oil from the oil cooler 38 to the internal sections of the engine 1. The solenoid valve 40 is adapted to be opened when the engine is operated in a given condition to release a part of the oil so as to prevent a pressure of the oil from excessively increasing.

The solenoid valve 40 is disposed closer to the front end of the engine 1 relative to the oil cooler 38 and in adjacent relation to the oil cooler 38. Thus, as shown in FIGS. 2, 4 and 5, the oil cooler 38 is interposed between the solenoid valve 40 and the exhaust passage 7 of the engine 1, to prevent the solenoid valve 40 from being directly exposed to radiant heat from the exhaust passage 7 having a fairly high temperature during running of the engine 1.

Figure 6:
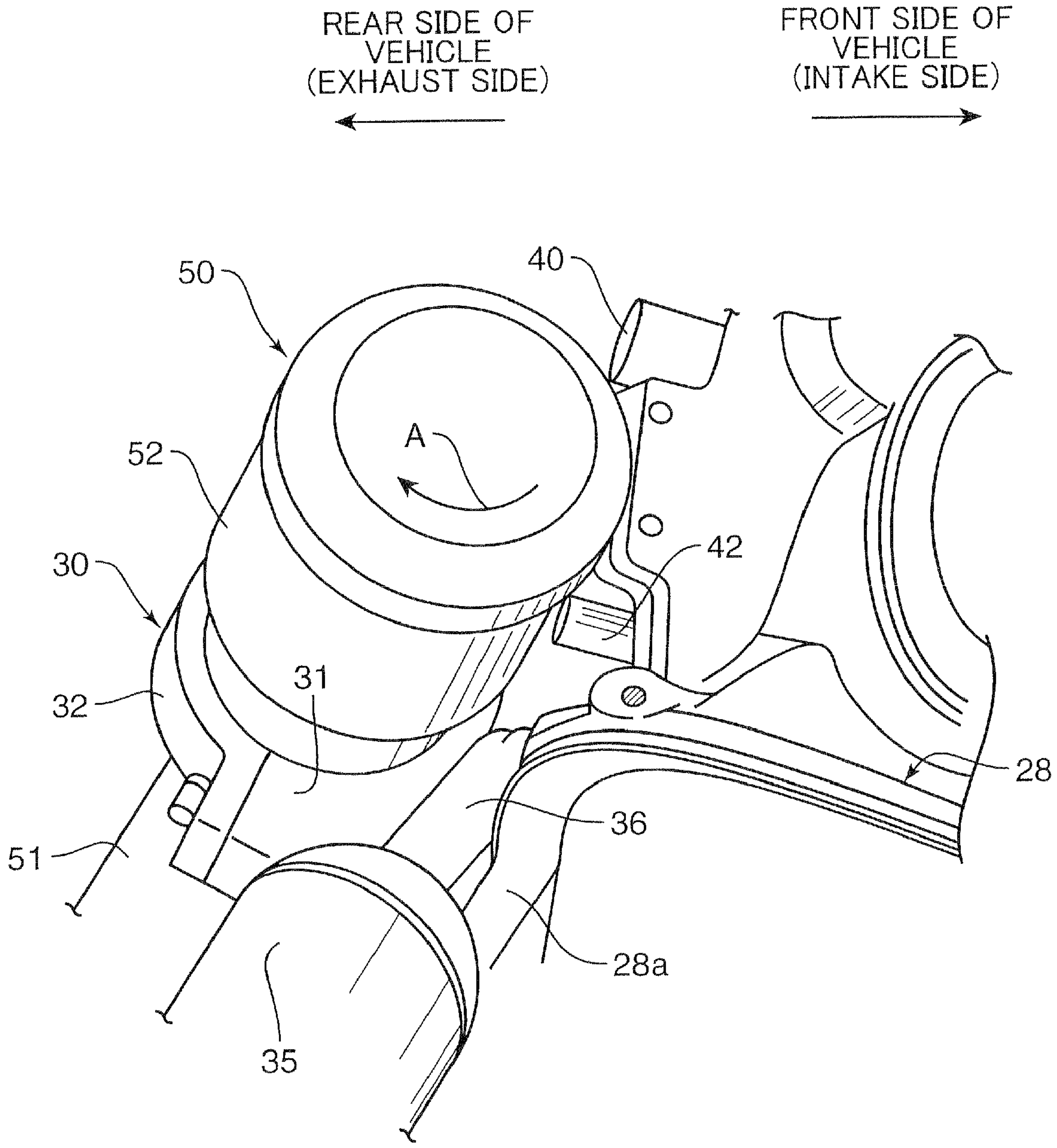
FIG. 6 is a perspective view showing a distal end of a driveshaft and components of the engine therearound, when viewed from therebelow and the front side of the engine.

FIG. 6 is a perspective view showing the distal end of the driveshaft 50 and components of the engine therearound, when viewed from therebelow and the front side of the engine 1. As shown in FIG. 6 in addition to FIGS. 2 to 4, a crank angle sensor 42 is mounted to the vehicle-rearward lateral surface of the lower block 12 at a position located close to the front end of the engine 1 and adjacent to the shaft joint bracket 30 and the filter bracket 36 in the widthwise direction of the vehicle, to detect a rotation angle of the crankshaft 8. The crank angle sensor 42 is operable to detect a rotation angle of the crankshaft 8, for example, by electromagnetically reading passage of a tooth of a pulser (a disc-shaped member having a plurality of teeth formed in an outer periphery thereof) adapted to be rotated integrally together with the crankshaft 8.

As shown in FIGS. 2, 3 and 6, the crank angle sensor 42 is mounted at a height position overlapping the driveshaft 50, when viewed from the rear side of the vehicle. More specifically, the crank angle sensor 42 is mounted to the vehicle-rearward lateral surface of the lower block 12 at a position located in opposed relation to the universal joint unit 52 of the driveshaft 50 having a relatively large diameter. Thus, the crank angle sensor 42 is shielded from the rear side of the vehicle by the universal joint unit 52.

Further, the flange section 28 for fastening (joining) two engine components consisting of the lower block 12 and the oil pan 15, together, are located below the crank angle sensor 42. As shown in FIGS. 2 to 6, a rear-flange section 28*a* of the flange section 28 located below the driveshaft 50 to extend in the widthwise direction of the vehicle are formed to protrude from the vehicle-rearward lateral surface of the engine 1 in the rearward direction of the vehicle by a given distance, and to cover the crank angle sensor 42 from below (hereinafter, the rear-flange section 28*a* of the flange section 28 will be referred to as "flange section 28*a*" for short.) Thus, the crank angle sensor 42 is mounted to the vehicle-rearward lateral surface of the lower block 12 at a height position above the flange section 28*a* between the lower block 12 and the oil pan 15 and in overlapping relation with the driveshaft 50 (more specifically, the universal joint unit 52 of the driveshaft 50) when viewed from the rear side of the vehicle.

As described above, in the arrangement structure for a sensor to be mounted to an engine of a vehicle, according to the above embodiment, the driveshaft 50 for rotatably driving the front wheel is arranged along the vehicle-rearward lateral surface of the engine 1 arranged in the engine compartment 2 of the vehicle in the posture allowing the crankshaft 8 to be oriented in the widthwise direction of the vehicle, and the flange section 28*a* as a joining section between two members constituting the engine (the lower block 12 and the oil pan 15) is provided to protrude in the rearward direction of the vehicle and at a height position below that of the driveshaft 50, wherein the crank sensor 42 is mounted to the vehicle-rearward lateral surface of the engine 1 at a height position located above the flange section 28*a* and in overlapping relation with the driveshaft 50 when viewed from a rear side of the vehicle. This arrangement structure has an advantage of being able to more reliably protect the crank angle sensor 42 mounted to the engine 1 against foreign objects, such as water and a pebble, to adequately maintain performance of the crank angle sensor 42 on a long-term basis.

More specifically, in the above embodiment, the crank angle sensor 42 is mounted to the vehicle-rearward lateral surface of the engine 1. Thus, even if water, such as rainwater coming in from a front end of the vehicle, gets into the engine compartment 2 of the vehicle during traveling of the vehicle, the water from the vehicle-front can be shielded by the engine 1, to prevent the crank angle sensor 42 mounted to the vehicle-rearward lateral surface of the engine 1 from being wetted by the water. In addition, the driveshaft 50 is arranged to cover the crank angle sensor 42 from the rear side of the vehicle, and the flange section 28*a* is provided below the crank angle sensor 42 to protrude in the rearward direction of the vehicle. Thus, even if a foreign object, such as a pebble kicked up by a front wheel, comes in toward the crank angle sensor 42, for example, from an obliquely downward position on the rear side of the vehicle with respect to the engine 1, the incoming foreign object can be shielded by the driveshaft 50 and the flange section 28*a*, to effectively prevent malfunction of the crank angle sensor 42 due to being hit by the foreign object to adequately maintain performance of the crank angle sensor 42 on a long-term basis.

In the above arrangement structure, the flange section 28*a* for joining the lower block 12 of the cylinder block 10 and the oil pan 15 beneath the lower block 12 together, and the driveshaft 50 for rotatably driving a front wheel, are utilized to prevent a foreign object, such as a pebble, from hitting the crank angle sensor 42. This provides an advantage of being able to achieve the protection of the crank angle sensor 42 with a simple and economic structure utilizing existing components. Further, during traveling (forward traveling) of the vehicle, the driveshaft 50 is rotated in a direction indicated by the arrowed line A in FIG. 6. Thus, even if a foreign object, such as a pebble, hits the driveshaft 50 from therebelow, the foreign object can be flicked off in a direction away from the crank angle sensor 42 (in the rearward direction of the vehicle). This provides an advantage of being able to more reliably prevent the foreign object from hitting the crank angle sensor 42.

In the above arrangement structure, the universal joint unit 52 having a diameter greater than that of the driveshaft body 51 is provided at one end of the driveshaft 50, and the crank angle sensor 42 is mounted in opposed relation to the universal joint unit 52. This provides an advantage of being able to more reliably protect the crank angle sensor 42 against a foreign object, such as a pebble, by utilizing the universal joint unit 52 having a relatively large diameter.

More specifically, in the above arrangement structure, a relatively large area rearward of the crank angle sensor 42 can be shielded by the large-diameter universal joint unit 52, to more reliably reduce a possibility that a foreign object from hitting the crank angle sensor 42. In addition, a circumferential velocity of the universal joint unit 52 during rotation is greater than that of the driveshaft body 51. Thus, as compared with a structure where the crank angle sensor 42 is shielded by the driveshaft body 51, a foreign object coming in from below can be more reliably flicked off in the direction away from the crank angle sensor 42, to more effectively prevent the foreign object from hitting the crank angle sensor 42.

In the above embodiment, the shaft joint bracket 30 is mounted to the vehicle-rearward lateral surface of the lower block 12 to rotatably support the driveshaft 50, and the crank angle sensor 42 is arranged in adjacent relation to the shaft joint bracket 30 in the widthwise direction of the vehicle. This provides an advantage of being able to more effectively prevent a foreign object from hitting the crank angle sensor 42, by utilizing the shaft joint bracket 30.

In the above embodiment, the filter bracket 36 having a lower end attached to the oil filter 35 is mounted to the vehicle-rearward lateral surface of the lower block 12 in overlapping relation with the driveshaft 50 in an upward-downward direction, and the crank angle sensor 42 is arranged in adjacent relation to the filter bracket 36 in the widthwise direction of the vehicle. Thus, the crank angle sensor 42 is additionally shielded by the filter bracket 36. This provides an advantage of being able to more reliably protect the crank angle sensor 42 against a foreign object.

In the above embodiment, the crank angle sensor 42 for detecting a rotation angle of the crankshaft 8 is shielded by the driveshaft 50 and the flange section 28*a*. This provides an advantage of being able to adequately protect the crank angle sensor 42 against a foreign object, such as a pebble, by utilizing the driveshaft 50 and the flange section 28*a*, while allowing the crank angle sensor 42 to be mounted in a vicinity of the crankshaft 8, i.e., at a relatively low height position having a high risk of being hit by the foreign object.

Although the arrangement structure according to above embodiment is designed to protect the crank angle sensor 42 mounted to the engine as an inline four-cylinder engine against a foreign object by utilizing the driveshaft 50 and the flange section 28*a*, the arrangement structure of the present invention may also be applied to an crank angle sensor mounted to any other type of engine, such as a V-type six-cylinder engine.

Further, a senor to be protected by utilizing the driveshaft 50 and the flange section 28*a* is not limited to the crank angle sensor 42. This means that the arrangement structure of the present invention may also be applied to any other type of sensor to be mounted at a relatively low height position of an engine.

In the last place, features and advantages of the present invention disclosed based on the above embodiment will be summarized as follows.

The present invention provides an arrangement structure for a sensor to be mounted to an engine of a vehicle, wherein the engine is arranged in an engine compartment of the vehicle in a posture allowing a crankshaft of the engine to be oriented in a widthwise direction of the vehicle, and the sensor is mounted to a lateral surface of the engine. The arrangement structure comprises a driveshaft arranged along a vehicle-rearward lateral surface of the engine facing in a rearward direction of the vehicle, to rotatably drive a front wheel, and a flange section provided as a joining section between two members constituting the engine, to protrude in the rearward direction of the vehicle and at a height position below that of the driveshaft, wherein the sensor is mounted to the vehicle-rearward lateral surface of the engine at a height position located above the flange section and in overlapping relation with the driveshaft when viewed from a rear side of the vehicle.

In the arrangement structure of the present invention, the sensor is mounted to the vehicle-rearward lateral surface of the engine. Thus, even if water, such as rainwater coming in from a front end of the vehicle, gets into the engine compartment of the vehicle during traveling of the vehicle, the water from the vehicle-front can be shielded by the engine, to prevent the sensor mounted to the vehicle-rearward lateral surface of the engine from being wetted by the water. In addition, the driveshaft is arranged to cover the sensor from the rear side of the vehicle, and the flange section is provided below the sensor to protrude in the rearward direction of the vehicle. Thus, even if a foreign object, such as a pebble kicked up by a front wheel, comes in toward the sensor, for example, from an obliquely downward position on the rear side of the vehicle with respect to the engine, the incoming foreign object can be shielded by the driveshaft and the flange section, to effectively prevent malfunction of the sensor due to being hit by the foreign object to adequately maintain performance of the sensor on a long-term basis.

In the arrangement structure of the present invention, when the driveshaft includes a driveshaft body, and a universal joint unit provided at one end of the driveshaft to have a diameter greater than that of the driveshaft body, the sensor is preferably mounted in opposed relation to the universal joint unit.

This feature provides an advantage of being able to more reliably protect the sensor against a foreign object, such as a pebble, by utilizing the universal joint unit having a relatively large diameter.

Preferably, the arrangement structure of the present invention further comprises a shaft joint bracket mounted to the vehicle-rearward lateral surface of the engine to rotatably support the driveshaft, and wherein the sensor is arranged in adjacent relation to the shaft joint bracket in the widthwise direction of the vehicle.

This feature provides an advantage of being able to more effectively protect the sensor by utilizing the shaft joint bracket.

Preferably, the arrangement structure of the present invention further comprises a filter bracket having a lower end attached to an oil filter, the filter bracket being mounted to the vehicle-rearward lateral surface of the engine in overlapping relation with the driveshaft in an upward-downward direction, and wherein the sensor is arranged in adjacent relation to the filter bracket in the widthwise direction of the vehicle.

This feature provides an advantage of being able to more effectively protect the sensor by utilizing the filter bracket.

In the arrangement structure of the present invention, the sensor is not limited to a specific type. A preferred example of the sensor includes a crank angle sensor. The arrangement structure for the crank angle sensor has an advantage of being able to adequately protect the crank angle sensor against a foreign object, such as a pebble, by utilizing the driveshaft and the flange section, while allowing the crank angle sensor to be mounted in a vicinity of the crankshaft, i.e., at a relatively low height position having a high risk of being hit by the foreign object.

Preferably, in the above arrangement structure, the engine includes a cylinder block, and an oil pan attached to a lower end of the cylinder block, and wherein the flange section is provided as a joining section between the cylinder block and the oil pan.

This feature provides an advantage of being able to effectively protect the crank angle sensor located at a relatively low height position, by utilizing the flange section provided as the joining section between the cylinder block and the oil pan.

This application is based on Japanese Patent application No. 2008-238134 filed in Japan Patent Office on Sep. 17, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An arrangement structure for a sensor to be mounted to an engine of a vehicle, wherein the engine is arranged in an engine compartment of the vehicle in a posture allowing a crankshaft of the engine to be oriented in a widthwise direction of the vehicle, and the sensor is mounted to a lateral surface of the engine, the arrangement structure comprising:

a driveshaft arranged along a vehicle-rearward lateral surface of the engine facing in a rearward direction of the vehicle, to rotatably drive a front wheel, the driveshaft including:

a driveshaft body and a universal joint unit provided at one end of the driveshaft to have a diameter greater than that of the driveshaft body, and wherein the sensor is mounted in opposed relation to the universal joint unit; and a flange section provided as a joining section between two members constituting the engine, the flange section protrudes from the vehicle-rearward lateral surface of the engine in the rearward direction of the vehicle by a predetermined distance and at a height position below that of the driveshaft, wherein the sensor is mounted to the vehicle-rearward lateral surface of the engine at a height position located above the flange section and within the predetermined distance of the protrusion of the flange section in the rearward direction of the vehicle such that the sensor is covered by the flange section from below, and the sensor is mounted in overlapping relation with the universal joint when viewed from a rear side of the vehicle such that the sensor is shielded from the rear side of the vehicle by the universal joint.

2. The arrangement structure as defined in claim 1, further comprising a shaft joint bracket mounted to the vehicle-rearward lateral surface of the engine to rotatably support the driveshaft, and wherein the sensor is arranged in adjacent relation to the shaft joint bracket in the widthwise direction of the vehicle.

3. The arrangement structure as defined in claim 2, wherein an end of the driveshaft body on the side of the universal joint unit is rotatably supported by the shaft joint bracket.

4. The arrangement structure as defined in claim 1, further comprising a filter bracket having a lower end attached to an oil filter, the filter bracket being mounted to the vehicle-rearward lateral surface of the engine in overlapping relation with the driveshaft in an upward-downward direction, and wherein the sensor is arranged in adjacent relation to the filter bracket in the widthwise direction of the vehicle.

5. The arrangement structure as defined in claim 1, wherein the sensor is a crank angle sensor.

6. The arrangement structure as defined in claim 5, wherein the engine includes a cylinder block, and an oil pan attached to a lower end of the cylinder block, and wherein the flange section is provided as a joining section between the cylinder block and the oil pan.

7. The arrangement structure as defined in claim 1, further comprising a shaft joint bracket mounted to the vehicle-rearward lateral surface of the engine to rotatably support the driveshaft, and wherein the sensor is arranged in adjacent relation to the shaft joint bracket in the widthwise direction of the vehicle.

8. The arrangement structure as defined in claim 7, further comprising a filter bracket having a lower end attached to an oil filter, the filter bracket being mounted to the vehicle-rearward lateral surface of the engine, and wherein the shaft joint bracket is mounted to the engine in such a manner as to cover the filter bracket from the rear side of the vehicle.

9. The arrangement structure as defined in claim 1, further comprising a filter bracket having a lower end attached to an oil filter, the filter bracket being mounted to the vehicle-rearward lateral surface of the engine in overlapping relation with the driveshaft in an upward-downward direction, and wherein the sensor is arranged in adjacent relation to the filter bracket in the widthwise direction of the vehicle.

10. The arrangement structure as defined in claim 1, wherein the sensor is a crank angle sensor.

11. The arrangement structure as defined in claim 10, wherein the engine includes a cylinder block, and an oil pan attached to a lower end of the cylinder block, and wherein the flange section is provided as a joining section between the cylinder block and the oil pan.

* * * * *